Patented Feb. 19, 1935

1,991,918

UNITED STATES PATENT OFFICE 1,991,918

METHOD OF MANUFACTURING BLUE GLAZED CERAMIC ARTICLES

Margit Berchtold née Pick, Firenze, Italy

No Drawing. Application July 9, 1932,
Serial No. 621,757

2 Claims. (Cl. 91—72)

It is known to manufacture glazed ceramic articles having the appearance of ancient Egyptian products by applying water-soluble alkaline salts with an addition of copper oxide to bodies rich in silicon dioxide.

The present invention relates to such a method by observing certain conditions which are indispensable for obtaining successful result. The new method starts with coarse-grained bodies which contain at least 80% silicon dioxide (kieselsäure) $SiO_2$ and are baked at 1300° C. An unfritted glaze of silicon dioxide and water-soluble alkaline salts, such as potash, common salt, saltpeter, soda or Glauber's salt, with an addition of copper oxide is applied to the said baked bodies whereupon the baking is carried out at 1300° C. and the subsequent cooling is effected as uniformly and quickly as is practically possible.

The steps of manufacturing consist in first grinding together in wet state a silicon dioxide and a large quantity of water soluble alkaline salt with copper oxide to form a glaze; then applying said glaze to the surface of the porous body containing a large percentage of silicon dioxide; thereupon causing said glaze and body to combine intimately by baking at a temperature below the fusing point of silicon dioxide, thereby producing on said body a surface layer having a blue, dull, stone-like appearance.

The use of water-soluble alkaline salts affords the advantage that these salts penetrate the bodies and thereby produce a glaze which is burnt deep in the body and which cannot be subsequently splintered off. Moreover, the body is coarse-grained, in order to enable the said salt to penetrate the body easily and quickly.

It is essential for the manufacture of the articles according to the invention to bake and cool the body covered with the glaze. Both these working steps must be carried out as quickly as possible and uniformly for the components of the body. A certain period of time cannot be indicated therefor because this is always dependent on the special conditions and the working conditions of the actual muffle furnace.

I claim:

1. A method of manufacturing blue glazed ceramic articles having the appearance of ancient Egyptian products, which consists in applying to a coarse-grained body having been baked at 1300° C. and containing at least 80% of silicon dioxide, an unfritted glaze of silicon dioxide $SiO_2$ and water-soluble alkaline salts with an addition of copper oxide and then baking the thus coated body at 1300° C. and subsequently cooling the same as uniformly and quickly as is practically possible.

2. A method of manufacturing ceramic articles having the appearance of ancient Egyptian products, consisting in first grinding together in wet state silicon dioxide and a large quantity of alkaline salt, soluble in water, with copper oxide to form a glaze, said alkaline salt being selected from a group consisting of potash, common salt, saltpeter, soda and Glauber's salt; then applying said glaze to the surface of a previously fired porous coarse-grained body containing at least 80% of silicon dioxide; thereupon rapidly baking the thus coated body at a temperature of approximately 1300 degrees C., and finally rapidly and uniformly cooling the coated body, thereby causing said glaze to combine intimately with said body to produce a dull, stone-like appearance.

MARGIT BERCHTOLD, née PICK.